Feb. 4, 1969  E. E. McCOWN  3,425,771
LASER DEFLECTION SYSTEM FOR DISPLAY APPLICATIONS
Filed Dec. 4, 1964
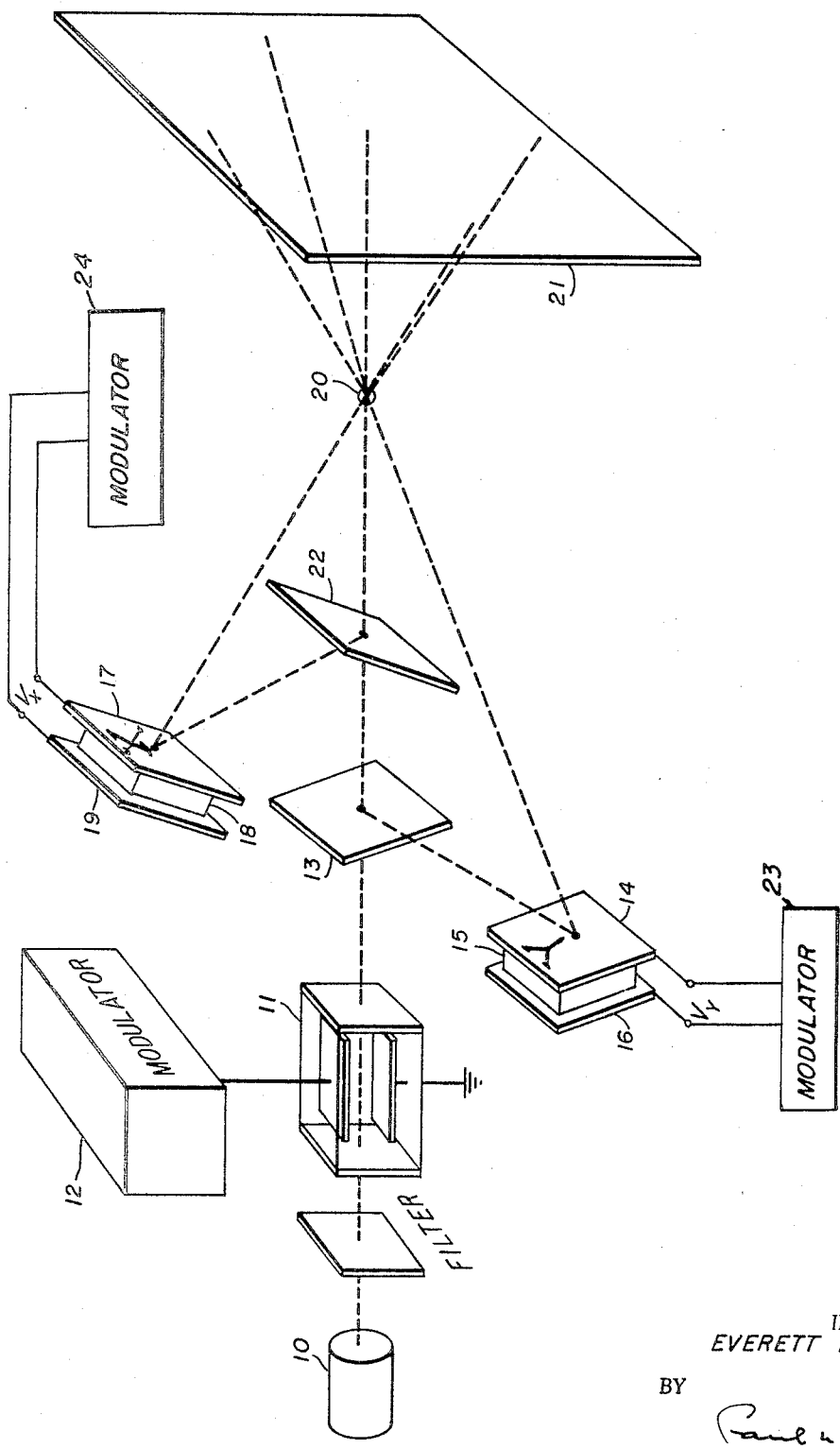
INVENTOR.
EVERETT E. McCOWN
BY
ATTORNEYS United States Patent Office 3,425,771
Patented Feb. 4, 1969

3,425,771
LASER DEFLECTION SYSTEM FOR
DISPLAY APPLICATIONS
Everett E. McCown, San Diego, Calif., assignor to the
United States of America as represented by the Secretary of the Navy
Filed Dec. 4, 1964, Ser. No. 416,172
U.S. Cl. 350—285                                    5 Claims
Int. Cl. G02f 1/34

ABSTRACT OF THE DISCLOSURE

A laser deflection system for use in a large screen display system. Three beams of laser radiation from the same laser are made to intersect before reaching the display screen. Provision is made to alter the phase of two of the beams so that the composite beam of radiation striking the display screen may be deviated.

---

The invention described herein may be manufactured and used by or for the Government of the United States of America for governmental purposes without the payment of any royalties thereon or therefor.

The present invention relates to a deflection system and more particularly to a laser deflection system and more specifically to a laser deflection system for large screen display applications.

In the past, large screen displays have comprised, for instance, wet film processes, dry film processes, processes known as Ediphor, Kalvar, Scriber, TV projection, etc. The above processes all have definite shortcomings however, for example, in the wet film process there is a high film usage and a 4 to 16 second lag between the time the information is received and the time the information is projected and displayed. The dry film process suffers from the same disadvantages as the wet film process. The processes such as Ediphor, Kalvar and Scriber have combinations of various shortcomings such as: time lag, complexity, process not perfected, and static process wherein it is difficult to remove the information once it is put on the material. The TV projection system suffers from the disadvantages of low light, extremely poor resolution and the high voltages involved.

An object of the present invention is to provide an improved large screen display system.

Another object of the present invention is to provide a display which utilizes a light source that is strong enough and coherent enough to provide high light levels, good resolution and which has an extremely low time lag between time information is received and the time information is displayed.

Other objects and many of the attendant advantages of this invention will be readily appreciated as the same becomes better understood by reference to the following detailed description when considered in connection with the accompanying figures which illustrates a preferred embodiment of the invention.

In the system as set forth in the figure a light source 10, which comprises a laser, emits a light beam at a single frequency i.e. is monochromatic. In addition, the light source is extremely high intensity and in that the light is coherent a very narrow beam is emitted. The output of the laser 10 is intensity modulated in a Kerr cell 11. The Kerr cell is essentially an organic liquid which is polarized by a high voltage which is provided by a modulator 12.

The monochromatic beam is then split in a beam splitter comprising partial mirrors 13 and 14 which deflect a portion of the beam corresponding to an X and Y portion and allow a main portion of the beam to pass through the partially silvered mirrors. Partially silvered mirror 13, which will correspond to the Y deflecting mirror, deflects a portion of the beam to a reflecting surface 14 which is physically attached to a transducer 15. The transducer 15 may be a piezoelectric transducer of any of the well known types and the transducer is contained between the reflecting surface 14 and another plate 16. A source of voltage $V_y$ provided by a modulator 22 is attached to plates 14 and 16 for providing a driving voltage to the transducer 15.

Partially silvered mirror 22, which will be referred to as the X deflecting mirror, deflects a portion of the main beam to a reflecting surface 17 which is also physically attached to another transducer 18, which may again be of any conventional type. Another plate 19 is provided and a pair of leads are attached to the reflecting surface 17 and plate 19 so that a source of voltage $V_x$ may be applied from an X modulator, 23.

The X and Y portions of the beam and the main monochromatic beam intersect at approximately point 20 and from there the composite beam is projected on a large screen 21 for display purposes.

In operation, the laser 10 emits a high intensity coherent monochromatic beam a portion of which is deflected in the partially silvered mirrors 13 and 22 corresponding to the Y and X mirrors. The reflected beam then impinges upon reflectors 14 and 17, respectively, and from there the X and Y portions recombine with the main beam at approximately point 20. Due to the fact that a voltage may be applied to the X and Y transducers the reflecting surfaces 17 and 14, respectively, may cause the X and Y portions of the beam path lengths to change with respect to the distance of the path length of the main beam. Thus, for instance, the distance that the Y portion of the beam travels from deflecting surface 13 to reflecting surface 14 to intersection 20 may vary over an appreciable portion of a wavelength with respect to the main beam path length from 13 to 20. The same holds true with respect to the X portion of the beam which travels from deflecting surface 22 to reflecting surface 17 back to the approximate intersection at 20. This path length may also be varied over an appreciable portion of a wavelength in distance with respect to the path length of the main beam from deflecting surface 22 to approximate intersection 20.

Due to the fact that the path lengths of the X and Y portions may be caused to vary over an appreciable portion of a wavelength at the frequency involved, the main beam may be deflected in the X and Y directions in the same sense that a radar antenna is electronically scanned in the X and Y directions. The resultant beam may modulate the screen 21 directly or may be used to modulate a storage element such as a photochromatic plate, film etc.

By way of another example, the initial light source would not necessarily be monochromatic and the transducer crystals would be proportional transducers, that is to say there would be a linear movement of the transducers which would be proportional to the modulating voltage. These transducers would reflect the light beam directly onto the screen for display. In such an equipment the laser beam splitters would direct all of the energy to the X and Y transducers and there would not be any recombination and thus no composite beam to be moved around on the screen.

Obviously many modifications and variations of the present invention are possible in the light of the above teachings. It is therefore to be understood that within the scope of the appended claims the invention may be practiced otherwise than as specifically described.

What is claimed is:
1. A laser deflection system for use in a large screen display system comprising:
    a source of high intensity coherent light;

beam splitting means optically aligned with the source of high intensity monochromatic light and operating to split the beam into X and Y components, said beam splitting means also operating to allow a portion of the monochromatic light to pass through;

Y deflection means having a reflecting surface positioned to intercept said Y component of the monochromatic light;

transducer means operatively coupled to said Y deflection means for moving said reflecting surface to vary the path length of said Y component;

X deflection means having a reflecting surface positioned to intercept said X portion of the monochromatic light;

X transducer means operatively coupled to said X deflection means for moving said X reflecting surface to vary the path length of said X component, said X and Y reflecting surfaces operating to direct the X and Y components of the monochromatic beam to reconverge upon the portion of the monochromatic beam that was passed through the beam splitting means in such a fashion that the composite beam is moved in the X and Y direction.

2. A deflection system as set forth in claim 1 wherein:
said X and Y transducers comprise piezoelectric crystals;
said piezoelectric crystals being bonded to the X and Y reflecting means, and further including;
separate modulator means operatively coupled to said X and Y crystals for causing said respective X and Y crystals to physically deform when a voltage is applied to them.

3. A deflection system as set forth in claim 2 and further including:
intensity modulating means in optical alignment between said high intensity source and said beam splitting means for intensity modulating in the output of said high intensity monochromatic light.

4. A deflection system as set forth in claim 3 wherein:
said intensity modulating means comprises a Kerr cell.

5. A deflection system as set forth in claim 4 wherein;
said beam splitting means comprises a pair of partially silvered mirrors, one each deflecting a portion of the monochromatic beam corresponding to X and Y portions;
said partially silvered mirrors each operating to reflect a portion of the beam and allow a portion of the beam to pass through.

No references cited.

JEWELL H. PEDERSEN, *Primary Examiner.*

O. B. CHEW, *Assistant Examiner.*

U.S. Cl. X.R.

350—150, 269